United States Patent
Heidenreich

(10) Patent No.: US 6,874,606 B1
(45) Date of Patent: Apr. 5, 2005

(54) TORQUE LIMITING CLUTCH HAVING CENTRIFUGALLY REGULATED CHARACTERISTIC TORQUE

(75) Inventor: David C. Heidenreich, Akron, OH (US)

(73) Assignee: Power Transmission Technology, Inc., Sharon Center, OH (US)

( * ) Notice: Subject to any disclaimer, the term of this patent is extended or adjusted under 35 U.S.C. 154(b) by 0 days.

(21) Appl. No.: 10/696,206

(22) Filed: Oct. 30, 2003

(51) Int. Cl.[7] .......................... F16D 7/02; F16D 25/04; F16D 43/284
(52) U.S. Cl. ............... 192/56.31; 192/88 A; 192/91 A; 192/104 F; 464/48
(58) Field of Search .......................... 192/56.31, 56.6, 192/83, 85 F, 88 A, 91 A, 104 F, 103 A, 103 F; 464/48

(56) References Cited

U.S. PATENT DOCUMENTS 4,471,861 A * 9/1984 McIntosh .................. 192/82 T
4,583,626 A * 4/1986 Spridco .................... 192/70.25
5,002,517 A * 3/1991 Heidenreich et al. ......... 464/48
5,626,215 A * 5/1997 Berger et al. ............ 192/58.42

FOREIGN PATENT DOCUMENTS

JP    57061831 A  *  4/1982  ........... F16D/43/08

* cited by examiner

Primary Examiner—Richard M. Lorence
(74) Attorney, Agent, or Firm—Renner, Kenner, Greive, Bobak, Taylor & Weber

(57) ABSTRACT

A torque limiting clutch or coupler is provided for implementation between input and output shafts. A spring biased friction stack assembly establishes a characteristic breakaway torque of the unit. A torque modifying plate is fixed to a pressure plate and, in conjunction with an end plate, defines a ring-like cavity having a bladder therein filled with a fluid. As the torque limiting clutch or coupler begins to rotate, the fluid within the bladder is forced outwardly by centrifugal force and, as the speed increases, the restriction on the fluid radially causes it to begin to move axially, causing the pressure plate to act against the spring bias in one embodiment and to supplement the spring bias in another embodiment, regulating the characteristic breakaway torque as a function of rotational speed.

20 Claims, 3 Drawing Sheets

TORQUE LIMITING CLUTCH HAVING CENTRIFUGALLY REGULATED CHARACTERISTIC TORQUE

TECHNICAL FIELD

The invention herein resides in the art of power transmission devices and, more particularly, to couplers between a power source and a power driven implement. More particularly, the invention relates to torque limiting couplers or clutches. Specifically, the invention relates to a spring applied torque limiting clutch with a circumferentially maintained fluid-containing bladder serving to regulate or change the torque setting of the torque limiter as a function of rotational speed.

BACKGROUND OF THE INVENTION

The use of torque limiting clutches of various types to absorb shock loads in equipment is commonly known. Presently, friction type torque limiters are commonly used to couple electric motors and gear reducers that drive large chain conveyors, called armored face conveyors, to protect the drive system and the chain against the shock load generated by the motor inertia when the conveyor is jammed. The torque required to start an armored faced conveyor is generally more than twice the torque required to run the system at operating speed. The shock load generated by the motor inertia is at a maximum at operating speed and a minimum at zero speed. However, current torque limiters provide the same torque at all speeds and must be sized for maximum torque to start the conveyor. A torque limiter that could automatically reduce its torque setting as speed increases would provide the full torque necessary at low speed to start the conveyor, where motor inertia torque is minimal, and would provide a lower slip torque at operating speeds so as to improve the shock load protection during normal operation.

Conversely, there are applications envisioned where an increase in torque may be desired at operating speed, with a lower torque being desired at start-up.

DISCLOSURE OF THE INVENTION

In light of the foregoing, it is a first aspect of the invention to provide a friction torque limiting clutch having a torque setting controlled by springs and where the operating speed torque setting can be reduced by a centrifugally actuated mechanism.

Another aspect of the invention is to provide a friction torque limiting clutch having a torque setting controlled by springs and wherein the operating torque setting can be increased via a centrifugally actuated mechanism.

Yet another aspect of the invention is the provision of a centrifugal actuation device comprising a fluid maintained within a sealed chamber or bladder, whereby the speed of the clutch creates a centrifugal pressure head that counteracts or assists the spring force of the torque limiter, thereby reducing or increasing the torque, dependent upon configuration.

A further aspect of the invention is to provide a friction torque limiting clutch wherein a fluid-filled bladder modifies the characteristic torque of the clutch, and wherein the bladder may be provided with baffles to provide a delayed time for torque decrease at start-up, and torque increase when a jam occurs.

A further aspect of the invention is the provision of a friction torque limiting clutch, having a centrifugally regulated characteristic torque, that is reliable and durable in operation, and easy to implement with state of the art torque limiting clutches.

The foregoing and other aspects of the invention which will become apparent as the detailed description proceeds are achieved by a regulated torque limiting clutch, comprising: a drive flange; an end plate in fixed spaced relation to said drive flange; interleaved friction and separator disks interposed between said drive flange and said end plate; a pressure plate; a spring assembly urging said pressure plate against said interleaved friction and separator disks and urging said friction and separator disks into forceful engagement with each other, establishing a characteristic torque for the torque limiting clutch; a torque regulating plate secured to said pressure plate, said torque regulating plate and said end plate defining a cavity therebetween; and a liquid within said cavity, rotation of said end plate imparting centrifugal force to said liquid and forcing said liquid radially and axially outwardly in said cavity, said liquid axially moving said torque regulating plate and said pressure plate, changing said characteristic torque.

Other aspects of the invention are attained by a regulated torque limiting clutch, comprising: a drive flange; an end plate fixed in spaced apart relation to said drive flange; interleaved friction and separator disks interposed between said drive flange and end plate; a pressure plate; a spring assembly urging said pressure plate against said interleaved friction and separator disks and into forceful engagement with each other; a torque regulating plate secured to said pressure plate and axially movable therewith, said torque regulating plate and said end plate defining and expandable cavity therebetween; and a bladder within said cavity, said bladder receiving a liquid therein.

DESCRIPTION OF THE DRAWINGS

For a complete understanding of the objects, techniques and structure of the invention reference should be made to the following detailed description and accompanying drawings wherein.

BEST MODE FOR CARRYING OUT THE INVENTION

Figure 1:
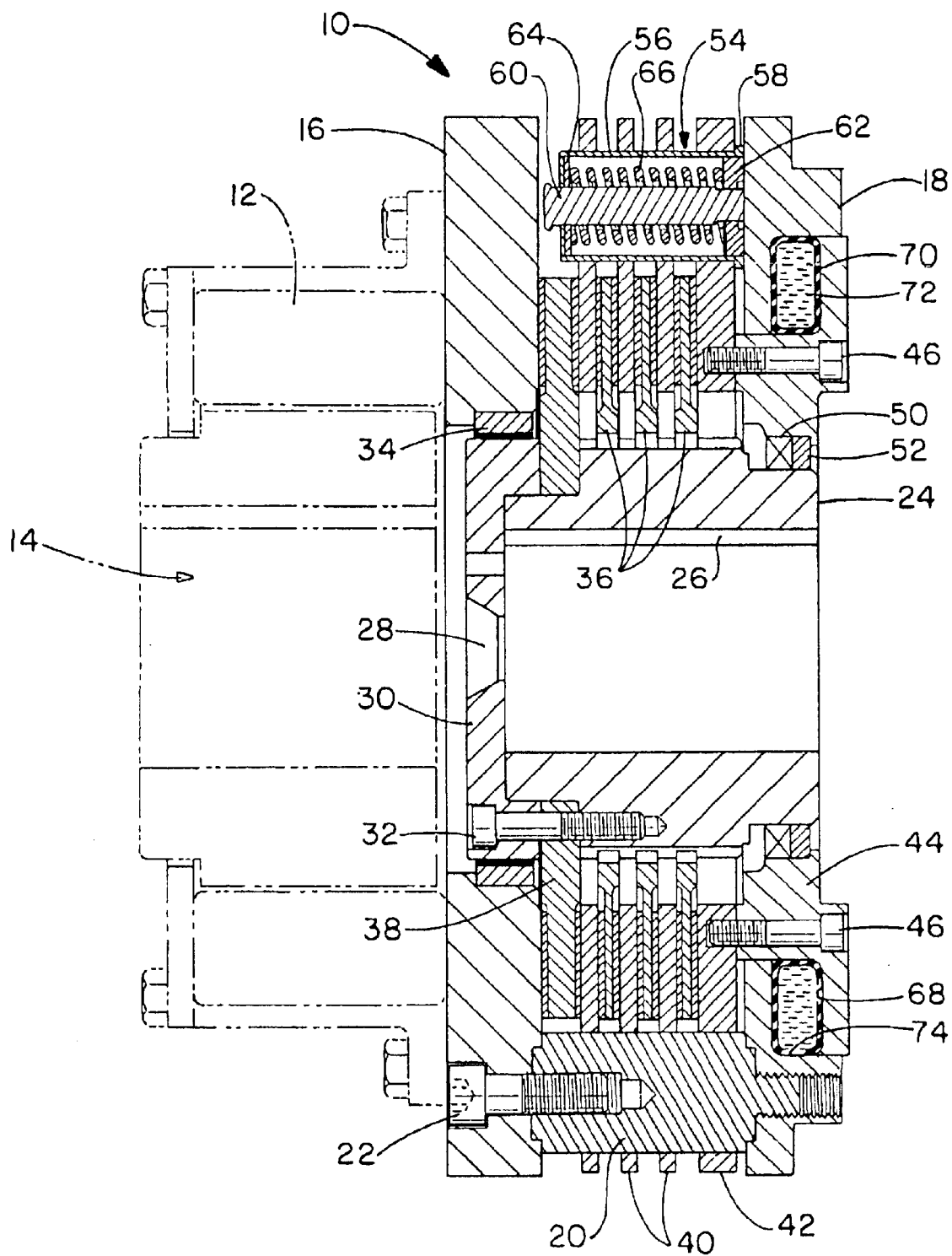
FIG. 1 is a cross sectional view of a first centrifugally regulated torque limiting clutch made in accordance with the invention, wherein the characteristic torque decreases with speed.

Referring now to the drawings and more particularly to FIG. 1, it can be seen that a first embodiment of a torque limiting clutch having centrifugally regulated characteristic torque is designated generally by the numeral 10. Specifically, the torque limiting clutch 10 is configured for a reduction of characteristic torque as a consequence of centrifugal force. On one end of the clutch 10, a flexible input coupling 12 is provided to receive a motor shaft or other power input source as by the input bore 14. The coupling 12 is mounted to a drive flange 16.

At the opposite end of the clutch 10, an end plate 18 is provided in fixed spaced relation to the drive flange 16 by torque pins 20. The torque pins 20 are threaded to the end plate 18 and secured to the drive flange 16 by bolts 22. It will be appreciated that the cross sectional nature of the drawing of FIG. 1 shows a single torque pin 20 and bolt 22, although, as with other elements and features to be described, a plurality of such elements would be uniformly spaced about the clutch 10.

An output hub 24 is provided as an adapter to receive a shaft of a driven member by means of a key 26 or other appropriate structure. A counterbore 28 is provided in the end plate 30 to secure the end of the shaft received by the output hub 24. Bolts 32 secure the end plate 30 to the output hub 24, as shown. A bearing 34 is interposed between the end plate 30 and the drive flange 16 to maintain concentrically of the input and output portions of the clutch.

As shown, the output hub 24 and end plate 30 are interposed within the cavity defined by the fixed spaced relation between the drive flange 16 and end plate 18. Also received within the cavity so defined is a torque limiting frictional subassembly or stack operatively interposed between the flexible input coupling 12 and the output hub 24.

The frictional subassembly or stack consists of disks 36 splined to the output hub 24 and a fixed friction disk 38 secured to the output hub 24 by the end plate 30 and bolts 32. As illustrated, the end plate 30 clamps the fixed friction disk 38 to the output hub 24. Separator disks 40 are interposed and interleaved between the friction disks 36, 38 and are driven by the torque pins 20. Also received and driven by the torque pins 20 is a pressure plate 42. Those skilled in the art will appreciate that the separator disks 40 and pressure plate 42 are axially slidably received by the torque pins 20, while the friction disks 36 are axially movably received by the spline of the output hub 24. A torque reduction plate 44 is secured by bolts 46 to the pressure plate 42 and mounted upon an end of the output hub 24 by a bearing 50 and seal 52. It will be appreciated that the torque reduction plate 44 is axially movable upon the output hub 24, and moves in tandem with the pressure plate 42 to which it is secured.

A plurality of spring cup assemblies 54, or other suitable force biasing means, are uniformly circumferentially spaced about the clutch assembly 10. The spring cup assemblies 54 engage the friction stack 36, 38, 40, 42 to effect the normal maximum engagement force between the friction elements 36, 38, separator disks 40 and pressure plate 42. The spring cup assemblies 54 are similar to those shown in U.S. Pat. Nos. 4,661,083 and 5,135,088. As shown, a cup 56 is provided with a flange 58 about one end thereof, the flange 58 engaging the pressure plate 42. The cup 56 receives a pin 60 and has a washer 62 fixed to one end thereof, with the opposite end of the pin extending from the cup 56. A washer 64 is slidingly received on the opposite end of the pin 60. A spring 66 is compressed and interposed between the washers 62, 64. In normal operation, the spring cup assemblies 54 urge the pressure plate 42 away from the end plate 18 by means of force applied through the flange 58. This urging of the pressure plate 42 causes forceful engagement between the friction member 36, 38 and separator members 40, 42 to frictionally operatively interengage the input coupling 12 and the output hub 24. There exists a characteristic breakaway torque between the input coupling 12 and output hub 24 dependent upon the number and nature of the disks 36, 38, 40, 42 and the number and nature of spring cup assemblies 54.

As is apparent from the above, forces tending to separate the pressure plate 42 from the end plate 18 serve to establish the characteristic breakaway torque of the clutch or coupler 10. A novel feature of the invention provides for adjustment or regulation of that force as a function of the rotational speed of the assembly 10, as presented more particularly below.

With continued reference to FIG. 1, it can be seen that a ring-like cavity 68 is defined between the end plate 18 and the torque reduction plate 44. A bladder 70 of appropriate elastomeric material, or the like, is received within the cavity 68, and is substantially filled with an appropriate fluid such as ethylene glycol or an aqueous solution of calcium carbonate, or the like. In the preferred embodiment of the invention, the fluid 72 has a specific gravity greater than that of water because the required size of the cavity 68 and bladder 70 is inversely proportional to the specific gravity of the fluid 72 employed. As presented above, the torque reduction plate 44 is axially movable with respect to the fixed end plate 18. As also noted above, the pressure plate 42, secured to the torque reduction plate 44 by bolts 46 is axially movable as well. In the quiescent state of the assembly 10, where there is no rotation of the assembly, the spring cup assemblies 54 apply maximum force of the pressure plate 42 away from the end plate 18 and into the friction stack of elements 36, 38, 40. Accordingly, forceful engagement between the flexible coupling 12 and output hub 24 is maximized, as is the characteristic breakaway torque. As the clutch assembly 10 begins to rotate, the fluid 72 within the bladder 70 of the cavity 68 is forced radially outwardly against the outer circumferential wall surface 74 of the cavity 68, defined by the end plate 18. As the centrifugal force on the fluid 72 forces it outwardly, the liquid 72 moves axially within the bladder 70 and cavity 68 and urges the torque reduction plate 44 away from the end plate 18, urging the pressure plate 42 with it, against the spring force of the spring cup assemblies 54. This reduces the normal frictional force among the elements of the friction stack 36, 38, 40, 42 thus reducing the characteristic breakaway torque. It will be appreciated that the torque reduction plate 44 acts as a piston, with the piston head defined by the portion of the cavity 68 within which the fluid 72 is existent.

In effect, the centrifugal force of the fluid 72 forces the fluid 72 outwardly within the cavity 68. Once the fluid 72 is at its most distant circumferential position, further circumferential force urges axial movement in the cavity 68, acting upon torque reduction plate 44.

Figure 2:
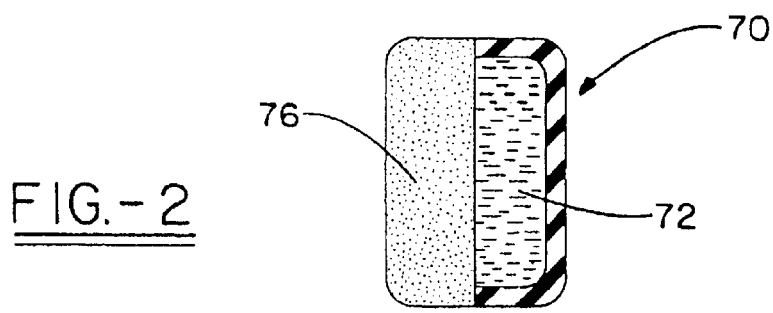
FIG. 2 is a partial cross sectional view of the fluid-containing bladder employed by the invention of FIG. 1, showing one of a plurality of baffles therein.

It is contemplated that baffles may be interposed within the bladder 70 to restrict abrupt movement and sloshing of liquid 72 within the bladder and to control circumferential movement of the fluid 72, controlling the delay time for torque decrease at start-up and torque increase when a jam occurs. To achieve this effect, baffles 76, such as webs or the like, may be formed within the bladder 70, as shown in FIG. 2. The baffles would typically be uniformly circumferentially spaced about the bladder 70, and may enter from opposite sides of the bladder, or uniformly from a single side, as deemed appropriate. The baffles extend part way across the cross sectional area of the bladder 70, on the order of 10–50 percent.

Those skilled in the art will appreciate that the amount of force imparted by the fluid 72 within the bladder 70 is a function of the rotational speed of the torque limiting clutch 10, the inner and outer diameters of the ring of fluid 72 or the portion of the cavity receiving the fluid, and the specific gravity of the fluid or oil used. As presented above, it is preferred that the specific gravity of the fluid or oil be greater than that of water.

Figure 3:
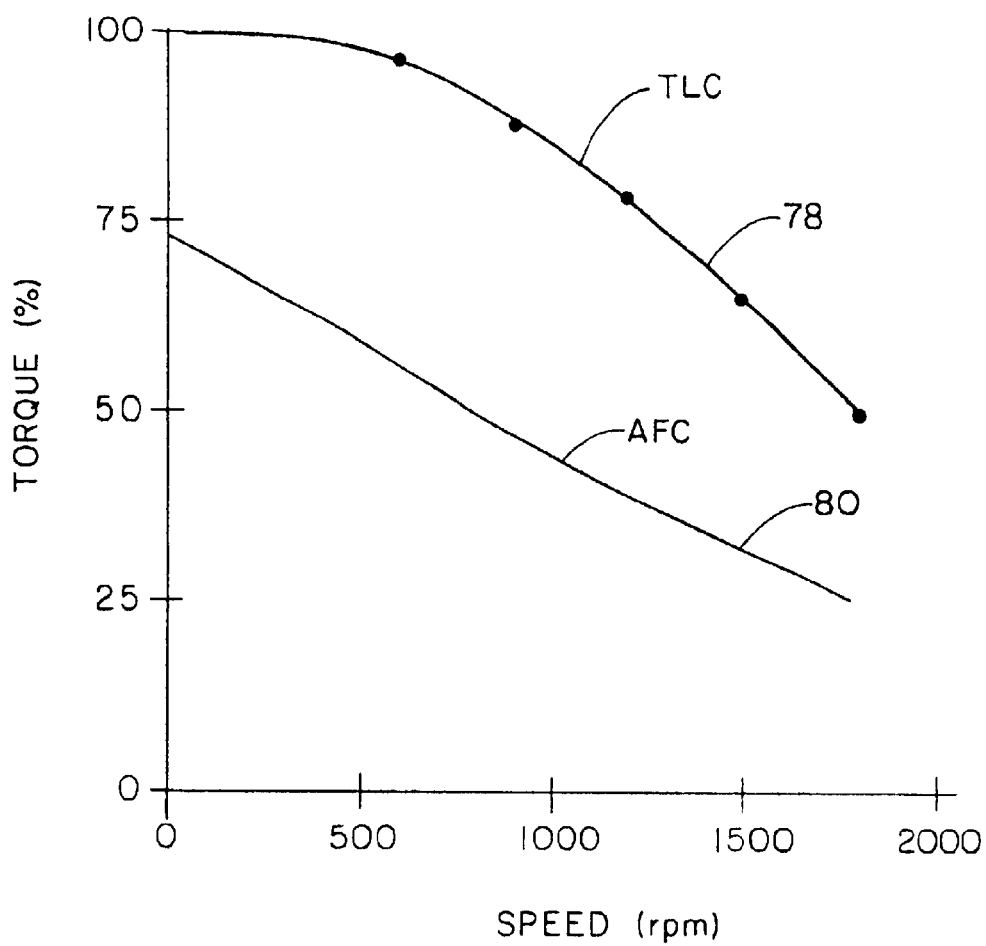
FIG. 3 is a graph showing required operational torque of a system and the changing characteristics of a torque limiting clutch made in accordance with the invention and used with such a system.

With reference now to FIG. 3, a pair of graphs show the operative benefit of the structure just described. The graphs relate the rotational speed of the clutch assembly 10 with the operational torque taken as a percentage of the maximum torque established at zero speed. Graph 78 shows the characteristic torque of the torque limiting clutch assembly 10, showing it maximum at zero speed and then reduced to fifty percent of maximum at the operational speed of the unit. As shown, the characteristic torque reduces somewhat uniformly from start-up to operative speed. Graph 80 shows the requirements of the system employing the torque limiting clutch 10 from start-up to operational speed. As shown, the system requires approximately seventy-five percent of maximum torque at zero speed and diminishes down to about twenty-five percent of maximum torque at operational speed. Accordingly, the torque limiting clutch 10, as illustrated by the graph 78, provides a degree of protection to the system employing the torque limiting clutch, while allowing for aberrations in torque demand during operation. Of course, the curve 78 may be configured to accommodate various numbers of system with various graphs 80. Changes in the number of friction and separator disks, nature and number of spring cup assemblies, volume and type of fluid employed and size of the piston head formed by the cavity receiving the bladder, may all impact the torque reduction characteristics.

Figure 4:
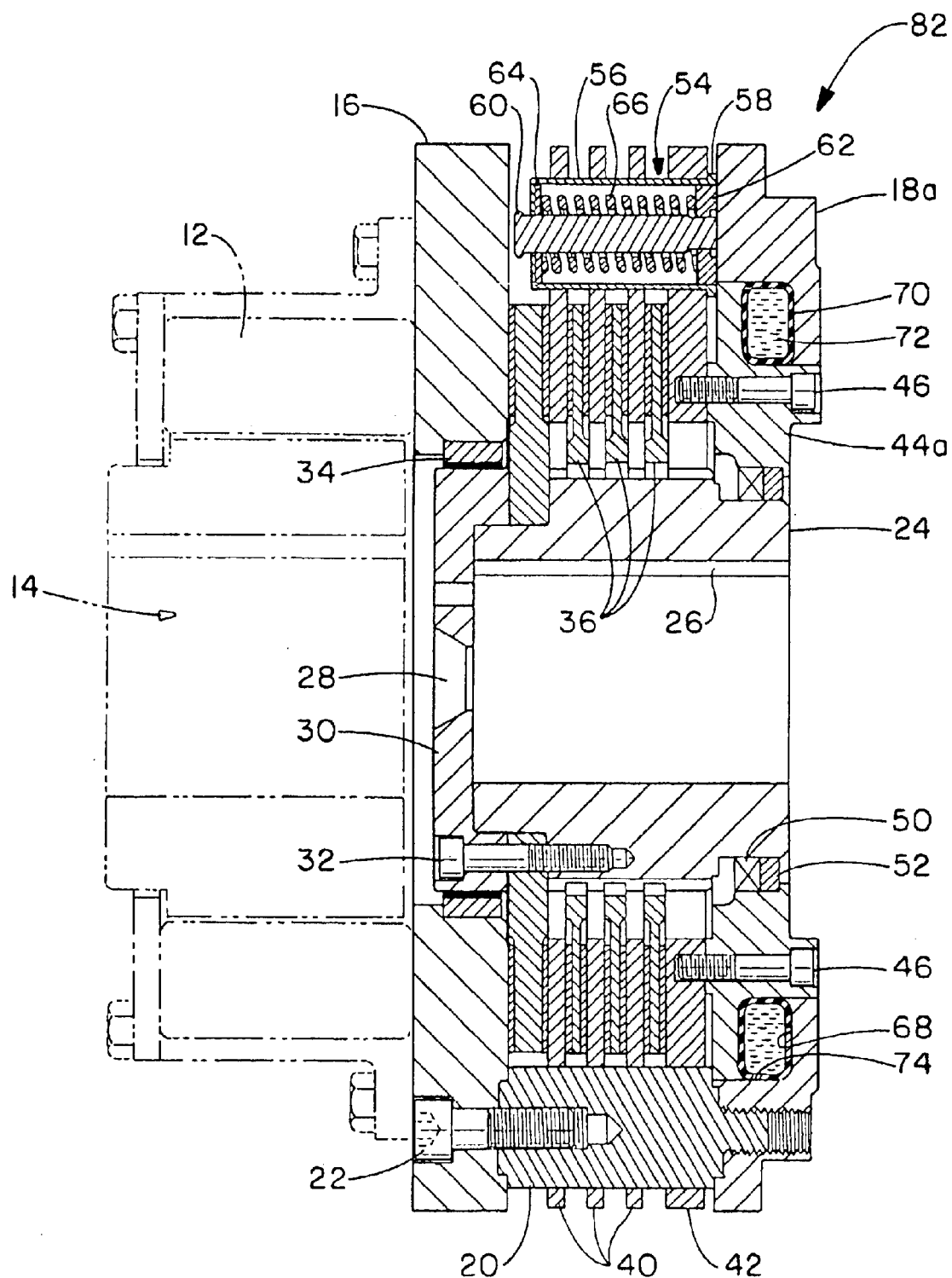
FIG. 4 is a cross sectional view of a second embodiment of the invention wherein the characteristic torque increases with speed.

The invention also contemplates the provision of a torque limiting clutch having a centrifugally regulated characteristic torque in which the characteristic torque is increased, rather than decreased with speed. Such a unit is shown in FIG. 4 and designated generally by the numeral 82. It will be appreciated that the unit 82 is substantially identical to the unit 10 of FIG. 1, but for an effective reversal of the end plate 18 and torque reduction plate 44 from the unit 10 to the end plate 18a and torque enhancing plate 44a in the embodiment 82 of FIG. 4. In the embodiment of FIG. 4, the torque enhancing plate 44a acts as a piston forcing the pressure plate 42 toward the friction stack rather than away from it. Accordingly, the piston 44a enhances the force of the spring cup assemblies 56, rather than reducing it. Thus, as rotational speed increases, the characteristic torque increases, as well.

Those skilled in the art will appreciate that both embodiments 10, 82 employ a fixed end plate that defines an inner or outer wall of the cavity 68 within which a bladder 74, filled with a fluid 72 is placed. In other words, both embodiments require one of the axially opposed walls of the cavity 68 to be fixed and the other movable. The direction in which movement is allowed determines whether the centrifugal force upon the fluid 72 within the bladder 74 serves to reduce or increase the characteristic torque.

Those skilled in the art will appreciate that the concept of the invention is to provide a means for effectively adjusting the applied spring force of the clutch or coupler as a function of rotational speed. A centrifugally actuated force adjuster, drivingly connected to the pressure plate, increases or decreases the application force of the pressure plate as a function of the force generated by the centrifugally actuated force adjuster due to rotational speed. The invention further contemplates that the centrifugally actuated force adjuster may be so configured with respect to the spring mechanisms to actually effect engagement or disengagement of the clutch assembly. In such a system, the force supplied by the centrifugally actuated force adjuster effects movement of the pressure plate to achieve the desired engagement or disengagement.

Those skilled in the art will also appreciate that, while the preferred embodiment is presented with respect to a fluid for generating the requisite force on the pressure plate, the invention contemplates the use of powders, particulate matter, and mechanical assemblies of levers, weights and linkages.

Thus it can be seen that the objects of the invention have been satisfied by the structure presented above. While in accordance with the patent statutes only the best mode and preferred embodiments of the invention have been presented and described in detail, the invention is not limited thereto or thereby. Accordingly, for an appreciation of the true scope and breadth of the invention reference should be made to the following claims.

What is claimed is:

1. A regulated torque limiting clutch, comprising:
   a drive flange; an end plate in fixed spaced relation to said drive flange;
   interleaved friction and separator disks interposed between said drive flange and said end plate;
   a pressure plate;
   a spring assembly urging said pressure plate against said interleaved friction and separator disks and urging said friction and separator disks into forceful engagement with each other, establishing a characteristic torque for the torque limiting clutch;
   a torque regulating plate secured to said pressure plate, said torque regulating plate and said end plate defining a cavity therebetween; and
   a liquid within said cavity, rotation of said end plate imparting centrifugal force to said liquid and forcing said liquid radially and axially outwardly in said cavity, said liquid axially urging said torque regulating plate and said pressure plate, changing said characteristic torque.

2. The regulated torque limiting clutch according to claim 1, wherein said cavity has an axially outer wall and an axially inner wall, one of said outer and inner walls comprising a portion of said end plate, and the other of said outer and inner walls comprising a portion of said torque regulating plate.

3. The regulated torque limiting clutch according to claim 2, wherein said axially outer wall comprises a portion of said torque regulating plate, said centrifugal force causing said liquid to urge said pressure plate away from said interleaved friction and separator disks, reducing said characteristic torque.

4. The regulated torque limiting clutch according to claim 2, wherein said axially inner wall comprises a portion of said torque regulating plate, said centrifugal force causing said liquid to urge said pressure plate toward said interleaved friction and separator disks, increasing said characteristic torque.

5. The regulated torque limiting clutch according to claim 1, further comprising a bladder within said cavity, said bladder retaining said liquid.

6. The regulated torque limiting clutch according to claim 5, wherein said liquid has a specific gravity greater than that of water.

7. The regulated torque limiting clutch according to claim 5, further comprising a drive flange for interconnection with an input power source, and an output hub for interconnection with a driven unit.

8. The regulated torque limiting clutch according to claim 7, further comprising a friction disk fixedly secured to said output hub.

9. The regulated torque limiting clutch according to claim 8, further comprising a bearing and a seal interposed between said output hub and said torque regulating plate.

10. The regulated torque limiting clutch according to claim 7, wherein said spring assembly comprises a cup having a spring urging against one end thereof, and a flange at an opposite end thereof engaging said pressure plate.

11. The regulated torque limiting clutch according to claim 10, further comprising torque pins interconnecting said drive flange and said end plate, said torque pins being received by said separator disks.

12. The regulated torque limiting clutch according to claim 11, wherein said bladder comprises a plurality of circumferentially spaced baffles extending therewithin.

13. A regulated torque limiting clutch, comprising:
   a drive flange;
   a pressure plate;
   interleaved friction and separator disks interposed between said drive flange and pressure plate;
   a spring assembly having a spring force urging said pressure plate against said interleaved friction and separator disks and into forceful engagement with each other;
   a torque regulating plate secured to said pressure plate and axially movable therewith; and
   a centrifugally actuated mechanism in communication with said torque regulating plate for modifying said spring force as a function of rotational speed of the torque limiting clutch.

14. The regulated torque limiting clutch according to claim 13, wherein said centrifugally actuated mechanism is taken from the group of liquid, powder, particulate matter, and mechanical assemblies of levers, weights, and linkages.

15. The regulated limiting clutch according to claim 13, wherein said centrifugally actuated mechanism comprises a liquid within a cavity.

16. The regulated torque limiting clutch according to claim 15, wherein said cavity has a pair of axially separated walls, a first stationary wall and a second axially movable wall.

17. The regulated torque limiting clutch according to claim 16, wherein said liquid is maintained within a bladder within said cavity.

18. The regulated torque limiting clutch according to claim 17, further comprising an end plate comprising said first stationary wall, and wherein said second axially moveable wall is established by said torque regulating plate.

19. The regulated torque limiting clutch according to claim 18, wherein said stationary wall is proximate said pressure plate and said movable wall is distal said pressure plate.

20. The regulated torque limiting clutch according to claim 18, wherein said movable wall is proximate said pressure plate and said stationary wall is distal said pressure plate.

* * * * *